United States Patent [19]

Silverstein

[11] 4,273,098

[45] Jun. 16, 1981

[54] TRANSPARENT COMPOSITE LAMINAR STRUCTURE, SOLAR COLLECTOR AND METHOD

[75] Inventor: Seth D. Silverstein, Schenectady, N.Y.

[73] Assignee: General Electric Company, Schenectady, N.Y.

[21] Appl. No.: 593

[22] Filed: Jan. 2, 1979

[51] Int. Cl.³ .......................... F24J 3/02; B32B 15/00
[52] U.S. Cl. .................................. 126/417; 126/447; 126/452; 126/446; 126/901; 428/432; 428/422; 350/1.6
[58] Field of Search ............... 126/447, 417, 432, 444, 126/446, 901, 452; 428/432, 442, 522; 350/276 R, 284, 1.6, 1.7, 164; 427/165–166, 169

[56] References Cited

U.S. PATENT DOCUMENTS

| | | | |
|---|---|---|---|
| 2,207,656 | 7/1940 | Cartwright et al. | 427/165 X |
| 3,244,547 | 4/1966 | Orr et al. | 428/432 X |
| 3,290,203 | 12/1966 | Antonson et al. | 428/432 X |
| 3,677,814 | 7/1972 | Gillery | 428/432 X |
| 3,947,620 | 3/1976 | Plant et al. | 428/422 X |
| 3,949,259 | 4/1976 | Kostlin et al. | 350/1.6 X |
| 4,065,600 | 12/1977 | King et al. | 428/432 |
| 4,084,574 | 4/1978 | Golay | 126/447 |
| 4,091,793 | 5/1978 | Hermann et al. | 126/441 |
| 4,161,560 | 7/1979 | Kienel | 428/432 X |

OTHER PUBLICATIONS

*Handbook of Military Infrared Technology*, U.S. Office of Naval Research Department of the Navy, Washington, D.C., U.S. Government Printing Office, 1965, p. 325.

*Applied Optics*, vol. 15, No. 4, Apr. 1976, "Transparent Heat Mirrors for Solar Energy Applications," Fan and Bachner.

*Primary Examiner*—James C. Yeung
*Assistant Examiner*—Larry Jones
*Attorney, Agent, or Firm*—Donald R. Campbell; Marvin Snyder; James C. Davis

[57] ABSTRACT

An improved transparent laminar structure useful as a window in a solar collector having an absorber characterized with a low absorption/emission ratio is described. The structure includes a glass substrate, a particularly defined infrared-reflecting (IRR) layer provided on a major surface of the substrate, and a solar reflection-reducing layer of polymethacrylate composition provided on the IRR layer. Also described are an improved solar collector and method for collecting solar radiation, wherein the laminar structure is employed.

8 Claims, 2 Drawing Figures

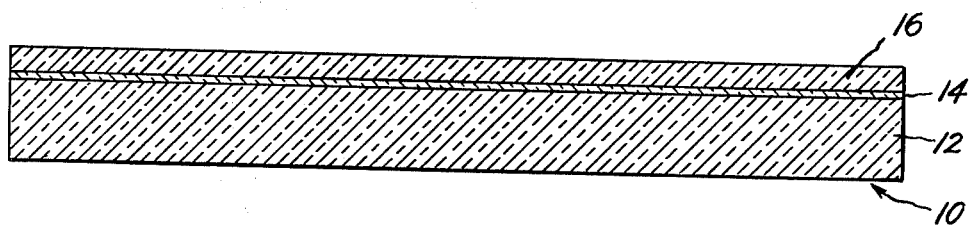
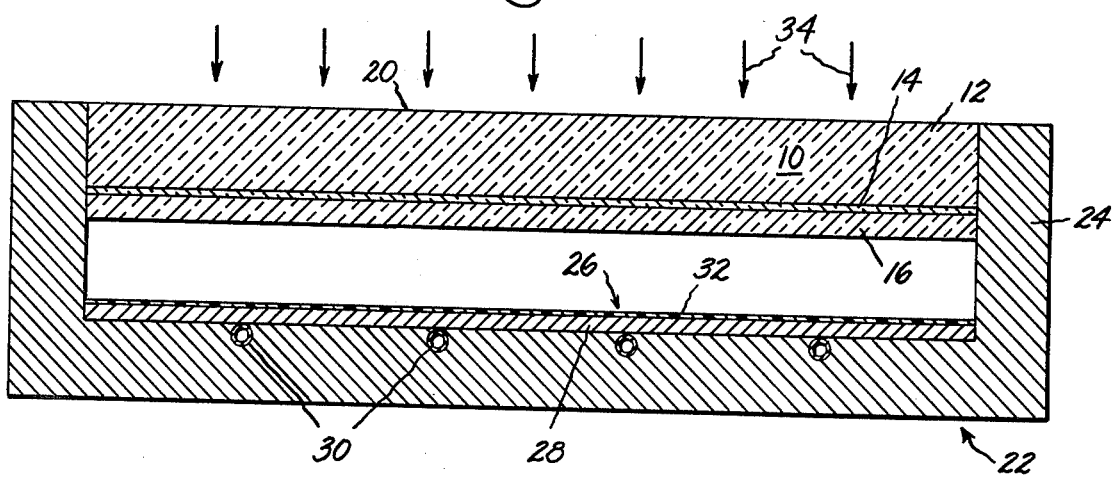

TRANSPARENT COMPOSITE LAMINAR STRUCTURE, SOLAR COLLECTOR AND METHOD

BACKGROUND OF THE INVENTION

This invention relates to an improved transparent laminar structure useful as a window in solar collectors, to improved solar collectors employing the laminar structure and to a method for collecting solar radiation.

Solar collectors serve to convert a major part of the radiation spectrum of sunlight into heat, which can then be transferred to a heat transporting medium, for example, water. An important property of a successful solar collector is the capability of efficient conversion of solar radiation into heat. Significant factors in the overall efficiency are the extent of transmission of solar radiation incident on the glass structure employed as a transparent cover or window and the capability of minimizing loss of heat from the absorber.

Heretofore known heat-insulating, light-transmitting laminar structures proposed for use as a cover or window for a solar collector have included a glass substrate, an infrared-reflecting (IRR) layer provided on at least a portion of a major surface of the glass substrate, and a solar reflection-reducing layer provided on that surface of the infrared-reflecting layer opposite the glass IR layer interface surface thereof. As described in U.S. Pat. No. 4,091,793 (Hermann et al) the transmission by glass tubes of incident solar radiation can be increased by providing on their inner surfaces a reflection-reducing layer of cryolite ($Na_3AlF_6$), magnesium fluoride ($MgF_2$), or an oxide of silicon ($SiO_x.SiO_2$). As further described therein, the reflection-reducing layer is effectively provided on an infrared reflecting layer, which is provided directly on the surface of the glass tubes for reflecting infrared radiation emitted by the absorber portion of a solar collector employing the tubes separating (i.e. disposed between) the absorber and the ambient atmosphere.

The aforesaid Hermann et al patent teaches that suitable infrared reflecting layers for the glass tubes thereof are made of silver, gold or tin oxide, but are preferably of indium oxide. The absorption surface thereof is taught to be either non-selectively blackened ($\alpha=1$, $e=1$) or is blackened and has a low emission factor ($\alpha \geq 0.9$; $e \leq 0.3$) for thermal radiation. The Hermann et al patent is incorporated herein by reference.

However, the solar collector art is still in need of improved light-transmitting laminar structures which are characterized by a good balance of infrared radiation trapping (i.e. good IR reflecting properties) and high solar transmission (i.e. a good coupling of solar conversion efficiency with low heat loss properties when the structure is included in a solar collector wherein the structure is interposed between the absorber and the ambient atmosphere). More particularly, the prior art is in need of a transparent laminar structure suitable for use in a solar collector which overcomes the problem of inherently substantial transmission-reducing Fresnel reflection at the cover/air interface of IR mirrors (glass substrate/IR reflecting layer laminar structures) employing IR reflecting layers made of semiconductor oxides such as tin oxide, indium oxide, etc., especially when such oxides are doped with doping agents, e.g. fluorine (F), tin, antimony (Sb), etc.

It has now been found by practice of the present invention that the foregoing high conversion/low heat loss is achieved by employing, as a reflection-reducing layer or overcoat on the semiconductor oxide layer of an IR mirror, a layer of polymethacrylate composition.

DESCRIPTION OF THE INVENTION

Generally stated, the present invention provides, in one aspect thereof, a heat-insulating light-transmitting laminar structure useful as a window in a solar collector, and particularly useful in a solar collector having an absorber characterized with low absorption/emission ratio (e.g. $\alpha/\epsilon$ of 1:1 or less). The laminar structure comprises (A) a glass substrate, (B) an infrared reflecting layer of semiconductor oxide provided on at least a portion of at least one major surface of the glass substrate. The semiconductor oxide may have (1) indices of refraction throughout a substantial portion of the primary solar spectrum ($\lambda=0.35$ to 1 micron) of greater than the corresponding indices of refraction of the glass substrate for each wavelength in such spectrum portion, as measured in air at 25° C., and has (2) a minor absorption factor (e.g. less than 0.2) throughout such spectrum portion and (3) substantial reflectivity (e.g. an average reflection factor of at least 0.6) in the infrared wavelength range from 5 to 15 microns. The laminar structure further includes a solar reflection-reducing layer of an organic polymeric composition provided on the infrared reflecting layer. The polymeric composition has a refractive index of from about 1.3 to about 1.7 as measured in air at 25° C. throughout the aforesaid solar spectrum portion and exhibits substantial transparency (e.g. transmittance of at least 0.8) in the aforesaid infrared wavelength range. In a preferred embodiment the polymeric composition consists essentially of a repeating unit of a $C_1$-$C_2$ alkyl ester of methacrylic acid and polymeric blends or interpolymers containing a substantial portion (e.g. 50% by weight or more) of such units.

Generally stated, in another aspect, this invention provides an improvement in the above-described system for collecting solar radiation. The improvement comprises employing the laminar structure of this invention as the cover in the solar collector with the laminar structure being oriented so that the exposed surface of the glass substrate is distal respecting the absorber and the reflection-reducing layer is proximate the absorber. Thus, the glass substrate generally faces the solar radiation to which the laminar structure is exposed and the reflection-reducing layer faces the absorber spaced therefrom.

In still another aspect of this invention, generally stated, the invention provides an improved method for collecting solar radiation wherein a solar collector absorber is exposed to the radiation through the heat-insulating light-transmitting laminar structure of this invention.

BRIEF DESCRIPTION OF THE DRAWING

Practice of the present invention will be more fully understood by having reference to the following detailed description taken with the accompanying drawing which schematically illustrates the present invention and the best mode contemplated for carrying it out.

In the drawing, wherein like numerals refer to similar elements throughout:

FIG. 1 is a transverse sectional view illustrating an improved light-transmitting laminar structure embodying the present invention;

FIG. 2 is a transverse sectional view illustrating an improved solar collector in accordance with this invention and further illustrating the improved method for collecting solar radiation.

DETAILED DESCRIPTION OF THE INVENTION AND MANNER AND PROCESS OF MAKING AND USING IT

Referring now to the drawing and particularly to FIG. 1 thereof, there is shown improved light-transmitting laminar structure 10 including glass substrate 12 and infrared reflecting layer 14 on the upper major surface thereof. The IR reflecting layer is of a semiconductor oxide composition selected to have indices of refraction (n's) to a substantial portion of light in the visible solar spectrum (i.e. wavelength, $\lambda$, of 0.35 to 1 micron) which are greater than the corresponding indices of refraction at each wavelength in such spectrum as exhibited by the glass employed, typically 1.5 at $\lambda = 0.6$ micron. Throughout this description and in the claims which follow, unless otherwise indicated, all indices of refraction referred to herein are as measured in air at 25° C. The semiconductor oxide material has a minor absorption factor, e.g. less than 0.2, throughout such solar spectrum portion. The semiconductor oxide is further characterized with substantial reflectivity (e.g. an average reflection factor of at least 0.6 and preferably at least 0.8) in the infrared wavelength range from 5 to 15 microns. Semiconductor oxides which may be suitably employed herein include indium oxide (preferably doped with tin), tin oxide (preferably doped with fluorine, antimony, or mixtures thereof), and mixtures of the foregoing. Each of these semiconductor oxides has an index of refraction substantially throughout the visible solar spectrum of about 2.0. The preferred infrared reflecting layer or coating is tin oxide doped with fluorine and has a substantially uniform thickness of from about 0.2 to about 0.4 micron, although thicknesses outside this range may prove suitable.

The laminar structure 10 further includes solar reflection-reducing layer 16 provided on a major surface of the infrared reflecting layer 14 such that the latter layer is sandwiched between substrate 12 and layer 16. Reflection reducing layer 16 is of an organic polymeric composition having a refractive index of from about 1.3 to about 1.7 and preferably from about 1.4 to about 1.45 (more preferably about 1.42) throughout a substantial portion of the visible solar spectrum. The polymeric composition is selected further such that it has substantial transparency (e.g. an average transmittance of at least 0.8) in the infrared wavelength range from 5 to 15 microns. Such organic polymeric compositions exhibit sufficiently low infrared absorption such that infrared radiation incident on the layer 16 (e.g. as may be received from a solar collector absorber during its conversion of incident solar radiation to heat energy) will have a first substantial portion transmitted therethrough and to the semiconductor oxide layer, which in turn will reflect a second substantial portion, thereby reducing heat losses through the laminar structure.

Polymeric layers having the above-described properties therefor result in transmittance for the structure substantially the same as observed for the glass substrate alone. The semiconductor oxide layer, included for its excellent performance in reducing infrared radiation heat losses, unfortunately (and in the absence of the polymeric composition layer) increases the Fresnel reflection of solar radiation incident on the glass substrate of IR mirrors formed of a similar glass substrate provided with the semiconductor oxide layers hereof.

The organic polymeric composition may be, for example, a polymer having at its principle repeating unit a lower (e.g. $C_1$–$C_4$) alkyl ester of methacrylic acid. The preferred polymeric composition is poly(methyl methacrylate) having a refractive index of about 1.42.

Although the polymeric layer may be of any suitable thickness, in general the thickness of this layer is preferably at least 0.5 micron for use as a solar collector window.

The laminar structure may be composited using well-known compositing techniques for the materials employed. In general the semiconducting layer can be provided on the glass substrate by heating the glass to about 400° C. and spraying it with an alcoholic solution of either a metal halide or of a metal organic. Pyrolytic decomposition results in an oxide-semiconductor layer.

The fluorine-doped tin oxide layer preferred herein can be deposited by the process taught in U.S. Pat. No. 3,677,814 (Gillery), whereby dibutyl tin difluoride is dissolved in alcohol with the aid of a solvating agent and subsequently sprayed onto a heated glass substrate.

Polymethyl methacrylate layers are preferably provided by spray-painting using well-known procedures therefor. Films of such polymer less than about 1 micron in thickness can more advantageously be applied by solution casting.

FIG. 2 illustrates solar collector 22 including laminar structure 10 (as a transparent cover) housed in housing 24, which is formed of a thermally insulating material.

The base of the housing is provided with absorber 26, which includes flat metallic plate 28 in contact with tubular ducts 30 which may (and preferably do) carry a heat transport medium, for example, water. The absorber further includes absorption surface 32 provided on the metal plate. Although the absorption surface may be blackened and have a low emission factor for thermal radiation (e.g. $\epsilon \leq 0.3$ with an $\alpha/\epsilon$ ratio of for example about 3), an advantageous feature of the solar collector aspect of this invention is that the absorption surface may be substantially non-selective ($\alpha = 1$, $\epsilon = 1$, for example). Thus, cost advantages of not requiring highly selective absorption surfaces result from employment of infrared reflecting layer 14, which typically reflects more thermal radiative energy than it rejects via Fresnel reflection of incident solar radiation. Non-selective absorption surfaces having $\alpha/\epsilon$ of 1/1 or less can effectively be accommodated by the present invention.

Absorber 26 absorbs at least a substantial portion of solar radiation incident thereon. The collector receives solar radiation directly or indirectly from the sun as schematically illustrated by rays 34 which are shown for simplicity as normal or perpendicular to the exposed major surface 20 of glass substrate 12. The light-transmitting laminar structure separates the absorber from the ambient atmosphere through which solar radiation rays are passed, thereby serving to provide heat insulation for the solar collector. The absorber is exposed to the solar radiation through the heat-insulating light-transmitting laminar structure. The efficiency of the collector in converting the energy of the solar radiation incident on glass substrate 12 to thermal energy in absorber 26, taken with the good efficiency of minimizing heat losses by virtue of infrared reflection by layer 14 typically characterizes solar collector 22 with a high overall efficiency.

A laminar structure was prepared in accordance with this invention having a 4.2 micron film of polymethyl methacrylate deposited on the semiconductor oxide surface (0.234 micron thick film of indium oxide doped with tin) on glass. Transmittance in the peak region (maximum intensity) of the solar spectrum (i.e. at about 0.580 micron wavelength) was found to be about 11% greater for this laminar structure having the polymer layer or overcoat than was found for a like laminar structure except not having the polymer overcoat. However, it is contemplated that the polymethyl methacrylate film should be less than 1 micron in thickness.

In solar collector 22 the distance between the laminar structure 10 and the absorber 26 may be, for example, about 20 millimeters. The metallic sheet 28 may be, for example, of copper and about 2 millimeters in thickness. The space between the laminar structure and the absorber 26 is preferably filled with air. The perimeter of the laminar structure is preferably joined to the housing by an airtight seal. If desired, such seal may be formed of an adhesive composition which further serves to mount the laminar structure in the housing.

BEST MODE CONTEMPLATED

The best mode contemplated for carrying out this invention has been set forth in the description above, for example, by way of setting forth preferred structural arrangements and dimensions, materials of construction, compositions and operating conditions, including but not limited to preferred ranges and values of amounts and other unobvious variables material to successfully practicing (including making and using) the invention in the best way contemplated at the time of executing this patent application.

The reflecting-reducing layer thickness may be as described in my copending application filed concurrently herewith, Ser. No. 000,954, which is incorporated herein by reference.

An upper limit of the useful thickness of the reflecting—reducing layer may be as shown at page 325 of the Handbook or Military Infrared Technology, W. L. Wolfe, Editor, 1965, Office of Naval Research, United States Department of the Navy, which is incorporated herein by reference.

It is understood that the foregoing detailed description is given merely by way of illustration and that many modifications may be made therein without departing from the spirit or scope of the present invention.

What is claimed is:

1. In a system for collecting solar radiation comprising an absorber adapted to absorb incident solar radiation and a heating-insulating transparent cover separating said absorber from the ambient atmosphere, said transparent cover comprising (A) a glass substrate oriented such that at least portions of opposite major surfaces thereof are respectively absorber-proximate and absorber-distal respecting said absorber, (B) an infrared-reflecting layer provided on the absorber-proximate surface portion of said substrate, and (C) a solar reflection-reducing layer provided on said infrared-reflecting layer, the improvement comprising:
   (I) said infrared-reflecting layer is of semiconductor oxide composition and provided on said absorber-proximate surface portion, said semiconductor oxide having (a) reflectivity of at least 60% in the infrared wavelength range from 5 to 15 microns and (b) less than about 20% absorption throughout a substantial portion of the visible solar wavelength spectrum of 0.3 to 2 microns,
   (II) said reflection-reducing layer is a film of a polymeric composition which has a thickness of greater than 0.5 micron and less than 200 micron, and has (a) refractive indices of from about 1.3 to about 1.7 as measured in air at 25° C. to a substantial portion of light in the visible solar spectrum and (b) substantial transparency in the infrared wavelength range from 5 to 15 microns.

2. The system of claim 1, wherein said absorber has a ratio of absorption to emission of less than 3.

3. A heat-insulating light-transmitting laminar structure useful as a window in a solar collector having a low absorption/emission ratio, which comprises:
   (A) a glass substrate having opposite major surfaces,
   (B) an infrared reflecting layer provided on at least a portion of at least one of said major surfaces and being of semiconductor oxide composition, said semiconductor oxide having (1) less than about 20% absorption throughout a substantial portion of said visible solar spectrum, and (2) reflectivity of at least 60% in the infrared wavelength range from 5 to 15 microns,
   (C) a solar reflection-reducing layer provided on said infrared-reflecting layer which is of a polymeric composition and has (1) refractive indices of from about 1.3 to about 1.7 as measured in air at 25° C. to a substantial portion of light in said visible solar spectrum, and (2) a thickness of at least 0.5 micron and less than 200 micron and substantial transparency throughout said infrared wavelength range from 5 to 15 microns.

4. The laminar structure of claim 3 wherein said reflection-reducing layer is of a polymethacrylate composition consisting essentially of a methyl methacrylate polyester or copolyester.

5. The laminar structure of claim 4 wherein said polymethacrylate composition is polymethyl methacrylate.

6. The laminar structure of claim 3 wherein said semiconductor oxide is selected from the group consisting of indium oxide ($In_2O_3$) doped with tin (Sn), tin oxide ($SnO_2$) doped with fluorine (F), tin oxide doped with antimony (Sb), and mixtures thereof.

7. The laminar structure of claim 3 wherein said structure is a substantially flat plate.

8. In a method for collecting solar radiation wherein an absorber is exposed to said radiation through a heat-insulating light-transmitting cover separating said absorber from the ambient atmosphere, said light-transmitting cover including (a) a glass substrate, (b) an infrared reflection layer provided on at least a portion of one major surface of said substrate, and (c) a reflection reducing layer provided on at least a portion of said infrared reflecting layer, the improvement wherein said cover is the laminar structure of claim 2, said structure being so oriented that the exposed surface of said glass substrate is distal respecting said absorber and said reflection-reducing layer is proximate said absorber such that said glass substrate generally faces the solar radiation to which the laminar structure is exposed and the reflection-reducing layer faces said absorber spaced from the laminar structure.

* * * * *